United States Patent
Shankar et al.

(10) Patent No.: US 10,645,444 B2
(45) Date of Patent: May 5, 2020

(54) ACCESSING WEB CONTENT IN OFFLINE MODE

(71) Applicant: SLING MEDIA PVT LTD, Bengaluru (IN)

(72) Inventors: Shruthi Shankar, Bengaluru (IN); Vikas Yelagonda, Bengaluru (IN)

(73) Assignee: SLING MEDIA PVT LTD, Bengaluru (IN)

( * ) Notice: Subject to any disclaimer, the term of this patent is extended or adjusted under 35 U.S.C. 154(b) by 0 days.

(21) Appl. No.: 16/024,762

(22) Filed: Jun. 30, 2018

(65) Prior Publication Data

US 2020/0007929 A1    Jan. 2, 2020

(51) Int. Cl.
| | | |
|---|---|---|
| *H04N 21/41* | (2011.01) | |
| *H04N 21/436* | (2011.01) | |
| *H04L 29/08* | (2006.01) | |
| *H04L 12/24* | (2006.01) | |
| *H04L 29/06* | (2006.01) | |
| *H04N 21/4147* | (2011.01) | |
| *H04N 21/437* | (2011.01) | |
| *H04N 21/433* | (2011.01) | |
| *H04N 21/4363* | (2011.01) | |
| *H04N 21/61* | (2011.01) | |
| *H04N 21/4782* | (2011.01) | |
| *H04N 21/414* | (2011.01) | |

(52) U.S. Cl.
CPC ... *H04N 21/43622* (2013.01); *H04L 41/5051* (2013.01); *H04L 65/80* (2013.01); *H04L 67/2857* (2013.01); *H04N 21/4147* (2013.01); *H04N 21/41407* (2013.01); *H04N 21/437* (2013.01); *H04N 21/4331* (2013.01); *H04N 21/43637* (2013.01); *H04N 21/4782* (2013.01); *H04N 21/6125* (2013.01)

(58) Field of Classification Search
None
See application file for complete search history.

(56) References Cited

U.S. PATENT DOCUMENTS

| | | | | |
|---|---|---|---|---|
| 2001/0001160 A1* | 5/2001 | Shoff | ................. | H04N 5/44543 725/51 |
| 2003/0149988 A1* | 8/2003 | Ellis | ................... | H04N 5/44543 725/87 |
| 2015/0215571 A1* | 7/2015 | Greene | ................. | H04N 5/765 386/326 |

* cited by examiner

*Primary Examiner* — Cai Y Chen
(74) *Attorney, Agent, or Firm* — Lorenz & Kopf LLP

(57) ABSTRACT

A portable computers or other client device that obtains files or media streams from a portable digital video recorder (DVR) or similar target device may not be able to obtain certain web content when the target device operates in an offline mode in which the Internet or a similar wide area network (WAN) is unavailable. When the client device contacts a web domain for authentication or other purposes, however, the client device suitably opens a secondary data connection to the domain to transparently request and received web content. The received content is cached by the client device for subsequent use in offline mode when the WAN is unavailable.

19 Claims, 2 Drawing Sheets

ACCESSING WEB CONTENT IN OFFLINE MODE

TECHNICAL FIELD

Figure 1:
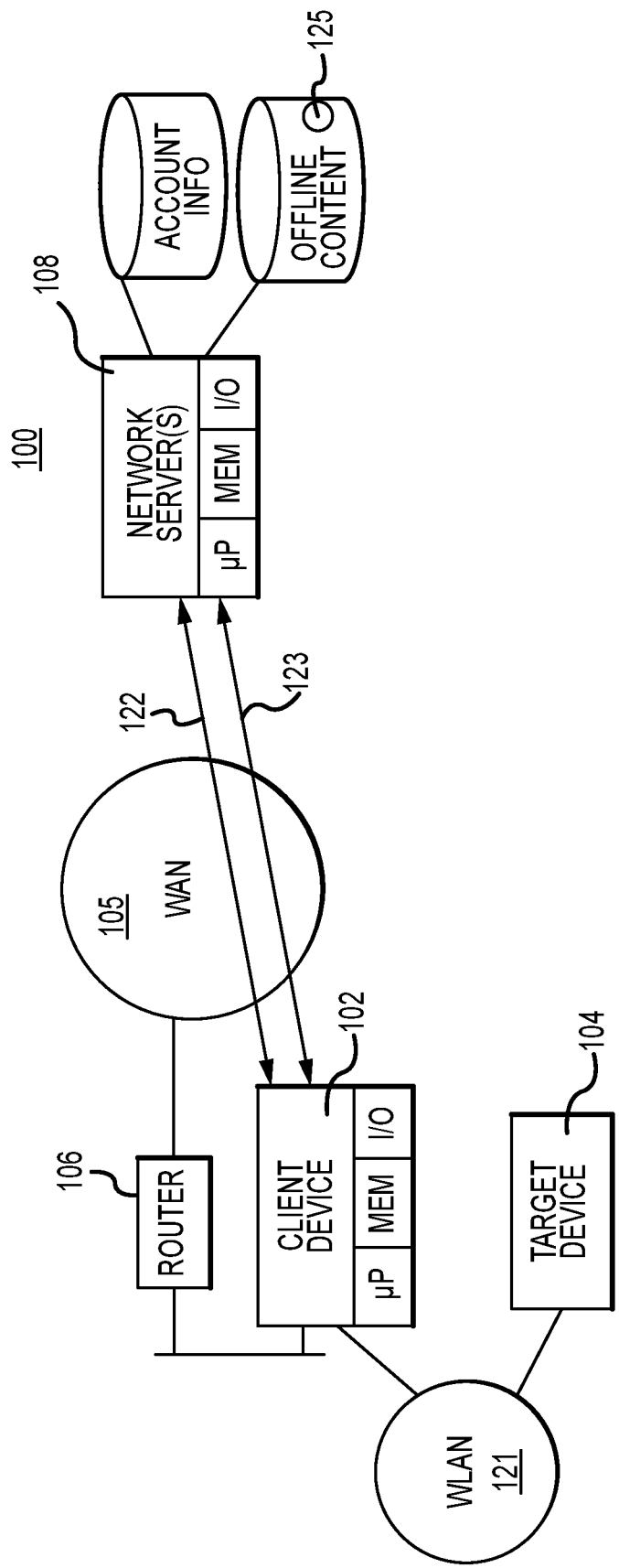

The following discussion generally relates to digital data communications, particularly to accessing of web content in an offline mode of operation.

BACKGROUND

Recent years have seen explosive growth in digital media. More content is always becoming available, and new systems and techniques for accessing digital streams or files are constantly being developed. Consumers now expect immediate access to a wealth of digital content from virtually any location, and at any time.

Challenges can arise, however, in supplying media content in certain settings. In particular, it can be a challenge to provide a smooth user experience when working with certain types of "offline" media sources. Certain types of video recorders, for example, are able to provide placeshifted media streams to client devices even when access to the Internet or a similar wide area network (WAN) is unavailable. These streams may be provided, for example, over a local area network (e.g., an IEEE 802.11 "WIFI" wireless LAN) that can be put in place to allow communication over a relatively short distance even if Internet or other wide area network access is not available. These sorts of devices may be useful in providing media streams while traveling (e.g., in an airplane, car or other vehicle) where access to large amounts of media content or other data is desirable.

It is desirable to create devices, systems and processes to improve access to stored or streaming media content even when the device supplying that content is operating in an offline mode, or when a WAN connection is not otherwise available. Other desirable features and characteristics will become apparent from the subsequent detailed description and the appended claims, taken in conjunction with the accompanying drawings and this background section.

BRIEF SUMMARY

Systems, devices and automated processes are provided to improve access to media content even when the target device that is supplying the content is operating in an offline mode in which the internet or another WAN is unavailable. According to various embodiments, a client device is able to cache certain web content in local storage before contacting the offline target device, thereby allowing the cached content to be retrieved and viewed at a later date or time. The cached content may be obtained through a secondary web connection that is relatively transparent to the user, or in any other appropriate manner.

Various embodiments provide an automated process performed by a personal computer, tablet computer, mobile phone or other client device having a processor and a storage. The process suitably comprises: establishing, by the client device, a first connection to a network service over a wide area network; while the first connection to the network service remains active, the client device establishing a second connection to the network service over the wide area network; transparently requesting and receiving, via the second connection over the wide area network, web content from the server system; caching the web content received via the second connection over the wide area network in the storage of the client device; subsequently establishing a third connection between the client device and a target device via a data connection that is separate from the wide area network; and in response to a client application requesting the cached web content, the client device obtaining the cached web content from the storage of the client device and presenting the cached content to a user of the client device.

Other embodiments may relate to devices, systems and/or other automated processes substantially as described herein, or configured to perform the various automated functions described herein. These and other examples are set forth in additional detail below.

BRIEF DESCRIPTION OF THE DRAWING FIGURES

Figure 2:
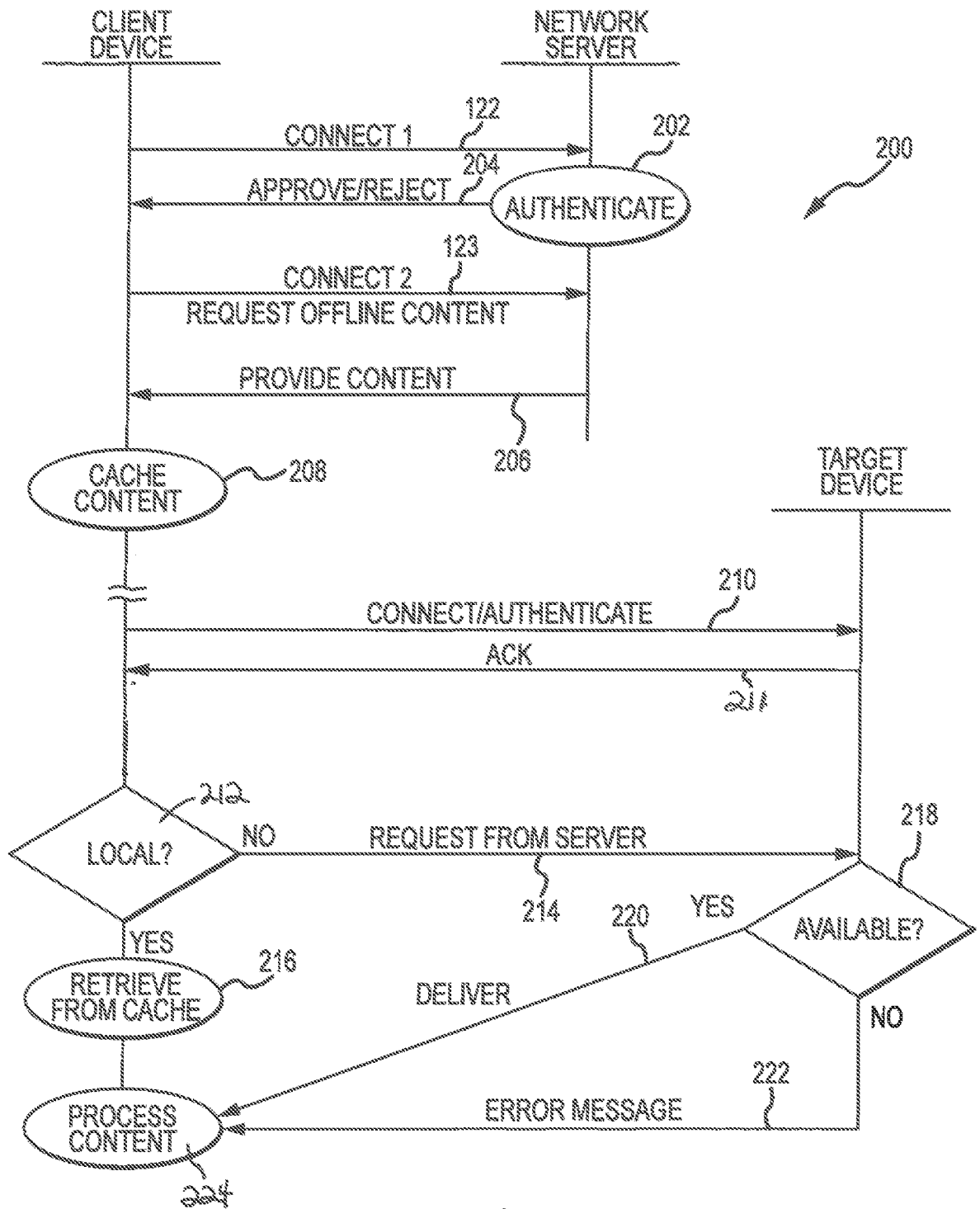

Exemplary embodiments will hereinafter be described in conjunction with the following drawing figures, wherein like numerals denote like elements, and:

FIG. 1 is a diagram of an example system for accessing online content in an offline mode; and FIG. 2 is a diagram showing various computer-implemented actions that occur in an example process 200 to access online content during an offline session between a client device and a target device.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Various embodiments relate to obtaining access to network content even during offline communications with a target device. Access is obtained by initially establishing a background or secondary connection to the online source to transfer content on an a priori basis (e.g., before the retrieved content is needed), and then caching the content for subsequent use. If the content is cached locally on the client device before it is needed, then it will be available for the client to access even if a real-time live connection to the content source is not subsequently available.

Offline access may be relevant in various settings and applications. Certain types of portable digital video recorders (DVRs), for example, may be designed to operate in an online mode in which they are able to communicate via a network, and in an offline mode in which they may support wireless connections to client devices but do not rely upon a live connection to the Internet or other WAN. The portable DVR may be useful, for example, when the user is traveling by airplane, train or car. During such travels, WAN access may not be available, but users can still access the portable DVR via WIFI or similar LAN/PAN technologies to obtain video streams of content that is stored on the DVR. This allows a large amount of content to be stored on a portable device for subsequent retrieval by one or more users even when a WAN is unavailable. A family traveling by car or airplane, for example, can carry a substantial amount of content on a portable DVR that can provide media streams to phones, tablets, notebook computers and/or the like for viewing by one or more family members.

Equivalent embodiments may apply to any other devices that are adept at communicating via local area networks but not via the Internet or another wide area networks. This may be due to configuration challenges (e.g., the user has not configured the device for WAN operation, or has configured it incorrectly, or the device relies upon another host device for WAN access). Some types of digital video recorder (DVR) devices, for example, may be designed primarily for LAN access for high-speed file transfers, but may not have the ability (or proper configuration) to communicate via the WAN. Similarly, many types of media players or the like may not be capable or configured for WAN communications.

Various embodiments may be particularly useful during offline communications with networked media storage devices, such as the HOPPER GO device available from Dish Network of Englewood, Colo., on local or personal area networks. Such devices are typically network-enabled storage devices that interface with a host to securely transfer and store media content (e.g., recorded television programs) for later streaming to a mobile phone, tablet or other client device via a separate network (e.g., a wireless network hosted by the server device that may not be connected to the Internet or a similar WAN). U.S. Pat. No. 9,307,289 is incorporated by reference as one example of a networked personal video recorder (PVR) that interfaces with a host to provide portable access to stored video content via a separate wireless network. Many alternate but equivalent embodiments could be used with any other network devices, servers, hosts and/or clients other that the specific examples referenced herein. Moreover, the concepts, systems, devices and processes described herein are not limited to use within video recorders or the like, but may be equivalently applied in any number of different applications and settings, including video gaming, media streaming, home or building control, and/or any other settings as desired.

With reference now to FIG. 1, an example data communications system 100 suitably includes a client device 102 that wishes to obtain video streams, files or other content from a target device 104 even when the Internet or a similar WAN 105 is not available to the target device 104. A user may operate a laptop computer as a client device 102, for example, to obtain placeshifted media content from a portable DVR or similar target device 104 while the user is traveling, or while access to a WAN is otherwise unavailable. In this example, the user 102 typically activates a web browser or similar application on the client device 102 that connects to a known web address (e.g., a uniform resource locator (URL)) that is hosted by the target device 104. The target device 104, which may be acting as a host for a WIFI or similar LAN/PAN 121, can recognize messages intended for the known address and respond appropriately.

If the target device is operating in offline mode, however, any requested content from websites hosted on network 105 may will not be immediately available to the client device. The web server operated by the target device 104 will not have access to the requested content, so it will generally return an error message (e.g., "content not found"), which can be frustrating and confusing to the user.

To avoid this, the client device 102 should have previously contacted an online service 108 that serves the desired content before attempting to access the target device 104 in offline mode. The client device 102 may contact a content server 108 to initially authenticate a user, for example, that desires to use the target device 104 in offline mode. In some implementations, the authenticated user obtains a cookie, token or similar digital credential that can later be submitted to the target device 104 for verification of user identity and preservation of DRM content protections.

While the user is visiting the web domain hosted by the content server 108, the client device 102 can automatically open a secondary connection 124 in a background or other unobtrusive manner to obtain other content that is hosted within that domain. In various embodiments, this unobtrusive secondary connection can be used to request and store web content for future use, including the content that will be needed in subsequent offline mode operation. Content transfer via the secondary connection 123 is particularly useful when the content is hosted within the same network domain as the content transferred in the primary connection 122. That is, content should lie within the same second-level domain (e.g., *.domainname.com) as the primary content. This will allow sharing of domain level cookies, for example, and storage in browser cache that is associated with the primary domain.

Generally speaking, server 108 is implemented as one or more network server systems each using conventional processors, memory, interfaces and other computing hardware under the control of an appropriate operating system and application software. Equivalently, server system 108 may be implemented using any sort of "cloud-based" hardware, such as the Amazon Web Services product available from Amazon.com, or any other cloud service such as Microsoft Azure, Google Cloud Platform, Adobe Cloud, VMware, IBM Cloud, Rackspace, Red Hat and/or the like. Although FIG. 1 illustrates one server system 108 that hosts both user authentication and web server functions, in practice these functions may be hosted by separate server hardware operating under a common domain controller or the like. The diagram also omits conventional load balancing, firewalls and other services that will likely be present in a typical network service system 108, as appropriate.

Both client 102 and target device 104 are typically implemented using conventional data processing hardware, software, firmware, etc. In various embodiments, target device 104 may be a networked digital video recorder (DVR), media player, video game player or other network appliance that provides video streams, files or other data to one or more client devices 102. To that end, target device 104 may be implemented with conventional processors, memory or mass storage, network interfaces and other computing hardware as appropriate.

Similarly, client device 102 may be implemented with any sort of mobile phone, tablet, personal computer, streaming media client, web browser device or the like. Client device 102 will typically include conventional processor, memory and interface hardware as well as appropriate operating systems and application software as desired. In various embodiments, client device 102 executes a web browser having applets, extensions or other client applications that perform the various functions described herein. Equivalently, the client functions may be performed by a separate application, as desired, that works in conjunction with a browser application or the like. The client application will typically be implemented with computer-executable instructions that are stored in memory or other digital storage for execution by a processor, as appropriate. Client applications are typically received and installed on the client device 102 using secure mechanisms to ensure the integrity of the application, and to prevent tampering with secure mechanisms used to authenticate the user or the device, and/or to prevent tampering with the application that could allow unpermitted access to copyrighted or otherwise protected media content. The client application will generally be compatible with one or more digital rights management services to allow the device 102 to receive and securely process media content.

To continue the network PVR example described above, client device 102 may be a personal computer or the like that is initially placed in communication with a router or gateway 106 that allows device 102 to communication with server 108 via the wide area network 105. The user directs the client device 102 to contact server 108 using a web browser or the like, and the client device 102 establishes connection 122 with the server 108 to authenticate the user, as desired. While the client device 102 is in contact with server 108, another I-frame or similar window can be created to use a secondary connection 123 via network 105 to obtain web content for use in offline mode. The retrieved content can be cached on the user device 104 for later use. In various embodiments, secondary connection 123 is established and content is retrieved and cached in the processing background without express knowledge by the user.

Media content or other data may be stored on the server device 104 for subsequent retrieval and viewing by a user of a phone, tablet, portable computer or other client device 102. In some implementations, target device 104 receives recorded and/or transcoded media content from a set top box or other host device via a wired or wireless connection. After the content is transferred, server device 104 is able to be removed from the host device for traveling or other portable access to the stored content even when network 105 is not available. That is, server 104 may provide video streams of the stored content to the client device 102 via its own IEEE 802.11, IEEE 802.14 or other network.

As noted above, client device 102 is any sort of computer, smart phone, tablet, personal digital assistant, video game player, media player or other device capable of interfacing with server 102 to receive media streams or other data. Generally speaking, client device 102 is able to communicate over the Internet or a similar WAN 110 using any appropriate cellular, Wi-fi, Bluetooth or similar interfaces. To that end, client device 102 allows the user to contact backend server 108 using a web browser, application or the like via data connection 122. Connections 122 and 123 may be, for example, TCP or UDP connections established over WAN 105 via a LAN connection to a broadband router 106 or the like, via a cellular connection, or via any other network path. In some implementations, connection 122 and 123 are established through a home-type LAN environment in which the target device 104 also initially resides, although this is not necessary in all embodiments.

The client device 102 authenticates with backend server 108 and receives credentials that are associated with the authenticated user to be stored on the client device 102 (e.g., in disk or solid state storage) for subsequent use in contacting server device 104 via different networks and/or network connections. Many browser programs implement cache storage in various ways; some store cached content in a directory tree based upon the URL of the cached content. Cached content may be compressed or otherwise modified, if desired, for convenient storage, although this is not required in all implementations.

In various embodiments, target device 104 provides a Wi-Fi (IEEE 802.11) or similar local area network (LAN) or personal area network (PAN) service 121 that client device 102 can subsequently use to establish streaming media or other data connections 124 with the target device 104 even when network 105 is unavailable. That is, the target device 104 is able to communicate with clients 102 even though the WAN 105 is offline. Equivalent embodiments could make use of a separate network 121 that is hosted by a separate access point other than server 104, if desired.

If the client device 102 requests web content from target device 104 while the target device 104 is in offline mode, the request can be processed by the client device 102 if the content has been previously cached in local storage by the client device 104. This allows the content to be presented to the user even though server 108 may not be directly accessible due to the unavailability of WAN 105.

FIG. 2 shows an example of a process 200 for processing offline content 125. As shown in FIG. 2, various functions are performed by client device 102, target device 104 and server system 108, resulting in various messages being passed between them. To that end, the various functions shown in FIG. 2 may be performed by one or more processors executing software or firmware instructions that are stored in memory or other data storages associated with the different devices 102, 104, 108, as appropriate. The various functions and messages shown in FIG. 2 may be combined, supplemented, executed in any different order and/or otherwise modified as desired to create any number of alternate but equivalent embodiments.

In the example of FIG. 2, a client device 102 attempts to establish initial contact with a target device 104 for obtaining media content or the like that is stored on the target device 104 even when the device 104 is operating in an offline mode in which the Internet or a similar WAN 105 is unavailable. To that end, the client device 102 initially contacts a network service 108 via a primary connection 122 over network 105 to authenticate the user or device 102 and/or to obtain suitable digital credentials for subsequent offline access to target device 104. The network service 108 receives a request from client 102 via connection 122, authenticates the user and/or device 102 as appropriate (function 202), and provides a suitable response message 204 via connection 122 indicating whether the authentication 202 was successful. In various embodiments, the client 102 stores a digital credential received after successful authentication for subsequent presentation to the target device 104, as desired.

While the client device 102 is in contact with the network service 108, a secondary connection 123 can also be created to transfer web content or the like for caching. Connection 123 may be made to a different server than connection 122, if desired. That is, authentication and web hosting functions may be performed by separate hardware that operates within a common network domain, as appropriate. Content is requested and delivered over connection 123 via conventional constructs (e.g., HTTP "get" and "put" statements). Requested content 125 is delivered to the client device 102 in any manner, where the content is cached or otherwise stored for subsequent retrieval (function 208). In various embodiments, connection 123 is established using a background i-frame construct within the browser or client application of client device 102 so that content is not immediately presented to the user, but is simply cached for subsequent retrieval and viewing when desired.

After the content is cached on the client device 102, a user of client device 102 may wish to receive media content or other data stored on the target device 104 even though network 105 is no longer available. The client application operating on client device 102 suitably contacts the target device 104 (function 210) in any manner. In various embodiments, the target device 104 hosts a separate wireless (or wired) LAN 121 that allows for local connections between target device 104 and one or more client devices 102 even when WAN 105 is not available. Target device 104 may host a Wi-fi network, for example, that allows for video streaming or other forms of file sharing, as desired.

When target device 104 receives a connection request 210 via network 121, then, the target device 104 is able to recognize the previously-received digital credential to grant or deny access. If access is approved, an acknowledgement message 211 is sent via network 121, and video streaming or other actions are allowed to continue.

In various embodiments, target device 104 operates a web server application that supplies content in response to requests 214 received from one or more client devices 102. If a client 102 has previously cached web content (e.g., web pages, images, etc.) for a requested page in local storage (function 212), however, then the client 102 will not need to contact target device 104 to obtain the content. To the contrary, client 102 will be able to resolve the request locally by retrieving the requested content from local cache (function 216) and presenting the retrieved content to the user via a browser or other application.

If the requested content is not stored locally (function 212), then the client device 102 suitably requests the missing content from target device 104 (function 214), which may be acting as a gateway device for any non-local content requested on network 121. If the target device 104 has access to the requested content (e.g., the content is stored locally on target device 104, and/or a network connection to the original source of the content is available) then the target device 104 suitably obtains and delivers the requested content to the client device 102 (function 220). Otherwise, if the content is unavailable to the target device 104, an error message is returned (function 222) to indicate that the requested content is unavailable. The client device 102 is able to process any content retrieved from local cache and/or received from the target device 104 as appropriate (function 224).

Although the network environment is often described herein as a "home" environment, equivalent concepts could be applied to offices, schools, factories, restaurants and bars, and/or any number of other environments that make use of multiple local area networks. Moreover, the concepts described herein with respect to contacting DVR or PVR video storage devices to establish video streaming could be equivalently applied for other applications or purposes, such as internet television (IPTV), video gaming, home or office control, file or print sharing and/or any other applications as desired.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process performed by client device having a processor and a storage, the process comprising:
   establishing, by the client device, a first connection to a network service over a wide area network, wherein the network service is addressable on the wide area network via an address on the wide area network;
   while the first connection to the network service remains active, the client device transparently establishing a second connection to the network service over the wide area network using the same address on the wide area network, wherein the second connection to the network service over the wide area network is not visible to a user of the client device;
   transparently requesting and receiving, via the second connection to the network service over the wide area network, web content available from the server system using the address on the wide area network;
   caching the web content received via the second connection to the network service over the wide area network in the storage of the client device;
   subsequently disconnecting from the wide area network and establishing a third connection between the client device and a target device via a separate data connection that is separate from the wide area network for receiving a media stream from the target device, wherein the address of the network service on the wide area network is not accessible via the third data connection; and
   in response to a client application executed by the client device requesting the web content available at the address of the network service on the wide area network via the separate connection, the client device redirecting the request from the address of the network service on the wide area network to the storage of the client device to thereby obtain the cached web content from the storage of the client device and presenting the cached content to a user of the client device.

2. The automated process of claim 1, wherein the target device is a portable digital video recorder.

3. The automated process of claim 1 wherein the requesting and receiving of the web content occurs without knowledge of the user of the client device.

4. The automated process of claim 3 wherein the second connection is opened within a background i-frame executing within a browser application executed by the client device.

5. The automated process of claim 4 wherein the network service operates within a hyper text transport protocol (HTTP) domain of the wide area network.

6. The automated process of claim 5 wherein the cached web content is associated with the HTTP domain of the wide area network.

7. The automated process of claim 6 wherein the cached web content is stored in a directory structure that represents the HTTP domain of the wide area network.

8. The automated process of claim 1 wherein the data connection that is separate from the wide area network is a wireless local area network (LAN) that is hosted by the target device.

9. The automated process of claim 8 wherein requests from the media player for the content are redirected to the cached web content from the storage of the client device when no connection to the wide area network is available.

10. The automated process of claim 9 wherein the target device is a portable digital video recorder (DVR), wherein the client device is a portable computer, and wherein the portable digital video recorder provides placeshifted media content to the portable computer via the wireless local area network that is hosted by the portable DVR.

11. A client device comprising a processor, a data storage and a network interface, wherein the processor is configured to execute instructions stored in the data storage that, when executed, perform an automated process comprising:
   establishing, by the client device, a first connection to a network service over a wide area network via the network interface, wherein the network service is accessible at an address on the wide area network;

while the first connection to the network service remains active, the client device transparently establishing a second connection to the address of the network service via the wide area network without the knowledge of a user of the client device;

transparently requesting and receiving, via the second connection over the wide area network, web content available at the address on the wide area network from the server system;

caching the web content received via the second connection over the wide area network in the data storage of the client device;

while the client device is subsequently disconnected from the wide area network, the client device establishing a third connection between the client device and a target device via the network interface for receiving a media stream from the target device, wherein the third connection is established over a separate data connection that is separate from the wide area network, wherein the address of the network service on the wide area network is not accessible via the third data connection; and in response to a client application executed by the client device requesting the web content at the address of the network service on the wide area network via the separate data connection, the client device redirecting the request from the address on the wide area network to the storage of the client device to thereby obtain the cached web content from the storage of the client device and presenting the cached content to a user of the client device.

12. The client device of claim 11 wherein the cached web content is stored in a directory structure that represents a hypertext transport protocol (HTTP) domain of the server system on the wide area network.

13. The client device of claim 11 wherein the data connection that is separate from the wide area network is a wireless local area network (LAN) that is hosted by the target device.

14. The client device of claim 13 wherein the client device obtains the cached web content from the storage of the client device when no connection to the wide area network is available.

15. The client device of claim 14 wherein the target device is a portable digital video recorder (DVR), wherein the client device is a portable computer, and wherein the portable digital video recorder provides placeshifted media content to the portable computer via the wireless local area network that is hosted by the portable DVR.

16. The client device of claim 11 wherein the second connection is opened within a background i-frame executing within a browser application executed by the client device.

17. The client device of claim 16 wherein the browser application is separate from the client application of the client device.

18. An automated process performed by media player device having a processor and a data storage, the automated process comprising:

initially establishing, by the media player device, a first connection to a network service over a wide area network to register the media player device with the network service, wherein the network service is addressable on the wide area network via an address on the wide area network;

while the first connection to the network service remains active, the client device transparently establishing a second connection to the network service over the wide area network using the same address on the wide area network, wherein the second connection to the network service over the wide area network is not visible to a user of the client device;

transparently requesting and receiving, via the second connection to the network service over the wide area network, web content that is available from the server system using the address on the wide area network for offline presentation to a viewer of the media player device at a later time;

caching the web content received via the second connection to the network service over the wide area network in the data storage of the media player device;

subsequently disconnecting from the wide area network and establishing a third connection between the client device and a portable digital video recorder device via a separate data connection that is separate from the wide area network for receiving a media stream from the portable digital video recorder device, wherein the address of the network service on the wide area network is not accessible via the third data connection; and in response to a client application executed by the client device requesting the web content available at the address of the network service on the wide area network via the separate connection, the client device redirecting the request from the address of the network service on the wide area network to the storage of the client device to thereby obtain the cached web content from the storage of the client device and presenting the cached content to a user of the client device.

19. The automated process of claim 18 wherein the third connection is a wireless local area network connection that is hosted by the portable digital video recorder device, and wherein the cached web content facilitates a secure login to the portable digital video recorder device from the media player device prior to receiving the media stream from the portable digital video recorder device.

* * * * *